(12) United States Patent
Johnson et al.

(10) Patent No.: US 11,951,440 B2
(45) Date of Patent: Apr. 9, 2024

(54) PHOTOCHEMICAL METHOD AND DEVICE FOR VOLATILE ORGANIC COMPOUND POLLUTION CONTROL

(71) Applicant: AMBIENT CARBON METHANE HOLDING APS, Frederiksberg C (DK)

(72) Inventors: Matthew Johnson, Lund (SE); Johan Albrecht Schmidt, Copenhagen (DK); Silvia Pugliese, Buttigliera Alta (IT)

(73) Assignee: AMBIENT CARBON METHANE HOLDING APS, Frederiksberg C (DK)

( * ) Notice: Subject to any disclaimer, the term of this patent is extended or adjusted under 35 U.S.C. 154(b) by 0 days.

(21) Appl. No.: 18/460,799

(22) Filed: Sep. 5, 2023

(65) Prior Publication Data

US 2023/0415098 A1    Dec. 28, 2023

Related U.S. Application Data

(63) Continuation of application No. 18/044,399, filed as application No. PCT/EP2021/074916 on Sep. 10, 2021.

(30) Foreign Application Priority Data

Sep. 10, 2020 (EP) .................... 20195550

(51) Int. Cl.
*B01D 53/72* (2006.01)
*B01D 53/00* (2006.01)
(Continued)

(52) U.S. Cl.
CPC ........... *B01D 53/72* (2013.01); *B01D 53/007* (2013.01); *B01D 53/73* (2013.01); *B01D 53/76* (2013.01); *B01D 53/96* (2013.01); *B01D 2251/104* (2013.01); *B01D 2251/108* (2013.01); *B01D 2251/208* (2013.01); *B01D 2257/7025* (2013.01); *B01D 2257/708* (2013.01);
(Continued)

(58) Field of Classification Search
CPC ...... B01D 53/72; B01D 53/007; B01D 53/76; B01D 53/96; B01D 2251/104; B01D 2251/108; B01D 2257/7025; B01D 2257/708; B01D 2258/0266; B01D 2258/06; B01D 2259/804
USPC ........................................... 423/212
See application file for complete search history.

(56) References Cited

U.S. PATENT DOCUMENTS

| 2003/0089594 A1 | 5/2003 | Kato et al. |
| 2008/0161591 A1 | 7/2008 | Richards |

FOREIGN PATENT DOCUMENTS

| CA | 2888538 A1 | 10/2016 |
| CN | 105727725 A | 7/2016 |
| JP | 2007068612 A | 3/2007 |

OTHER PUBLICATIONS

International Search Report dated Jan. 7, 2022, in corresponding International Patent Application No. PCT/EP2021/074916, 4 pages.

*Primary Examiner* — Anita Nassiri-Motlagh
(74) *Attorney, Agent, or Firm* — Maier & Maier, PLLC

(57) ABSTRACT

A method for removing methane and non-methane volatile organic compound concentrations from a gas stream. The method includes exposing the target gas to a halogen gas and a light from a suitable light source having a wavelength sufficient to activate halogen gas to halogen radicals, wherein the halogen radicals react with the VOC in the target gas to provide the target gas with a removed concen-
(Continued)

tration of VOC as well as a device including a reaction chamber for reacting the halogen radicals with the VOC in the target gas.

18 Claims, 10 Drawing Sheets

(51) Int. Cl.
*B01D 53/73* (2006.01)
*B01D 53/76* (2006.01)
*B01D 53/96* (2006.01)
(52) U.S. Cl.
CPC .. *B01D 2258/0266* (2013.01); *B01D 2258/06* (2013.01); *B01D 2259/10* (2013.01); *B01D 2259/122* (2013.01); *B01D 2259/802* (2013.01); *B01D 2259/804* (2013.01)

PHOTOCHEMICAL METHOD AND DEVICE FOR VOLATILE ORGANIC COMPOUND POLLUTION CONTROL

CROSS-REFERENCE TO RELATED APPLICATIONS

The present patent application claims benefit and priority to U.S. patent application Ser. No. 18/044,399 filed on Mar. 8, 2023 which claims the benefit of 371 National Stage Application No. PCT/EP2021/074916 filed on Sep. 10, 2021 which is hereby incorporated by reference into the present disclosure.

FIELD

The present invention relates to a method and a device for air pollution control. In particular, the present invention relates to a photochemical method and device for removing volatile organic compounds including methane from in a target gas and use of the device.

BACKGROUND

Volatile organic compounds (VOC) include methane and non-methane fractions, the latter commonly abbreviated NMVOC. Many specific NMVOCs are hazardous air pollutants, and NMVOCs together with methane give rise to secondary effects including climate change and the formation of air pollution [Harnung 2012]. Air pollution is a global problem according to the World Health Organization [WHO Ambient, WHO Indoor], the World Bank [WB 2016] and others, estimated to cause 3.3 million deaths annually from ambient air pollution [WHO Ambient] and 3.8 million from household air pollution [WHO Indoor]. Climate change is a global problem according to the United Nations [IPCC 2013], the Catholic Church [Francis 2015], the U.S. Department of Defense [U.S. DoD 2014], etc.

Methane has a closed shell of eight valence electrons and is chemically similar to a noble gas including physical properties such as a very low boiling point, high ionization energy, and low polarizability [Atkins 2013; NIST Chemistry Webbook]. This unique chemistry has a number of consequences. Methane is the least reactive of all hydrocarbons in the atmosphere, giving it the longest residence time and a large global warming potential (72) on a 20-year time scale [Harnung 2012]. This low reactivity (low reaction rate coefficient) means that it is hard to destroy methane with gas phase radical reactions without burning it at high temperature, and often methane is found at concentrations below that required to burn. In addition, burning may be undesirable, for example if it cannot be controlled and/or there is a risk of explosion. In addition to being relatively inert chemically, the unique electronic structure of methane means that it has very weak intermolecular interactions [NIST Chemistry Webbook]. Methane spends very little time on the surfaces of heterogeneous catalysts due to low affinity for surfaces leading to inefficient reaction, and it is difficult to trap using adsorbents in order to enhance concentrations.

There is a need for an efficient and cheap technology for methane and NMVOC emission control. Reaction and adsorption would be the most common methods of pollution control for methane and NMVOC at concentrations below the combustion limit (ca 4.4%) [Kwiatkowski 2019].

In this scenario, Gas Phase Advanced Oxidation (GPAO) [Johnson 2009] is a method for cleaning air based on the hydroxyl radical. The technology generates gas-phase hydroxyl radicals that initiate the oxidation by breaking the C—H bond of a wide range of VOCs. It has a number of advantages over traditional air purification methods [Adnew 2016], most importantly improved energy efficiency, but also reduced installation and running cost, and reduced waste stream. Current technologies based on hydroxyl radicals [Johnson 2009], however, are not able to react with methane in an efficient and fast way. Molecules such as propane, 2-methylpentane or n-hexane would react hundreds to thousands of times faster than methane [Darnall 1976]. This clearly represents a downside that must be overcome in order to obtain sufficiently fast reactions with methane in the gas phase. In GPAO, a short wavelength of light (high energy) is used to photolyse ozone, energy is lost as heat when the product oxygen atom reacts with water vapor or hydrocarbons to form the hydroxyl radical, and hydroxyl is lost to side reactions. These side reactions are also self-limiting to the process, constraining the concentration of hydroxyl that can be formed in the system. An English chemist/industrialist, Henry Deacon, invented the Deacon Process in 1868. It uses a catalyst to convert hydrochloric acid into chlorine gas. $4HCl+O_2\text{-(catalyst)} \rightarrow 2Cl_2+2H_2O$. The only change since then is that people have developed different and better catalysts. One of the best catalysts currently available is the ruthenium oxide catalyst developed by Sumitomo Corp.

SUMMARY

The world has been faced with technical problems relating to removing methane and/or NMVOCs from an airstream, for example an industrial vent or chimney or other point source, as required by emissions regulations or concerns for neighbors or the environment, control of odor from livestock or fermentation, etc. Current technologies are often too expensive, inhibiting installation. Removing methane from an airstream is also a priority because of concerns about pollution and climate change.

Methane is difficult to remove by homogeneous or heterogeneous chemical reaction or to separate by adsorption, due to its unique chemistry. In particular, in industrial settings, such as mining industries, the concentration of methane is higher relative to many other point sources, and the flow of air is larger. Adaptations to the process are necessary for the conditions of larger flow and methane concentration. Also, higher capital cost can be justified by the increased intensity and value of the process.

The present inventors provide a solution to these problems.

In a first aspect, the present invention relates to a method for removing VOC concentrations in a target gas comprising VOC, the method comprising, optionally in a suitable reaction chamber, exposing the target gas to a halogen radical precursor, such as a halogen gas, and a light from a suitable light source having a wavelength sufficient to activate the halogen radical precursor to halogen radicals, wherein the halogen radicals react with the VOC in the target gas to provide the target gas with a removed concentration of VOC.

In a second aspect the present invention relates to a device for removing VOC concentrations in a target gas comprising VOC, wherein the device comprises a) a reaction chamber for exposing the target gas to a halogen gas and a light from a suitable light source having a wavelength sufficient to activate halogen gas to halogen radicals; b) an inlet for receiving the target gas; c) an outlet for releasing the target gas with a removed concentration of VOC; d) a light source for providing a wavelength sufficient to activate halogen gas to halogen radicals; and e) optionally a filter and/or scrubber for decreasing or removing byproducts, such as halogen acid, e.g., HCl, unreacted halogen, e.g., chlorine, formaldehyde, CO, $CO_2$ before the target gas with the removed VOC concentrations leaves through the outlet.

In a third aspect the present invention relates to a system comprising the device of the second aspect.

Typically, the present invention relates to a system for removing VOC concentrations in a target gas comprising VOC, wherein the system comprises a) a reaction chamber for exposing the target gas to a halogen gas and a light from a suitable light source having a wavelength sufficient to activate halogen gas to halogen radicals; b) an inlet for receiving the target gas; c) an outlet for releasing the target gas with a removed concentration of VOC; d) a light source for providing a wavelength sufficient to activate halogen gas to halogen radicals; e) a scrubber for decreasing or removing byproducts, such as halogen acid, e.g., HCl, unreacted halogen, e.g., chlorine, formaldehyde, CO, $CO_2$ before the target gas with the removed VOC concentrations leaves through the outlet, wherein the scrubber extracts the halogen acid and converts it into halogen gas via oxidation and in the presence of a catalyst; f) optionally a liquefaction section collecting unreacted halogen gas from the outlet; g) optionally a recycling system for recycling the halogen gas from the outlet to the reaction chamber; h) optionally a recycling system for recycling the halogen gas extracted from the scrubber to the reaction chamber. In one embodiment, two scrubbers are present for decreasing or removing byproducts, such as halogen acid, e.g., HCl, unreacted halogen, e.g., chlorine, formaldehyde, CO, $CO_2$ before the target gas with the removed VOC concentrations leaves through the outlet, wherein the scrubbers extract the halogen acid and converts it into halogen gas via oxidation and in the presence of a catalyst.

In a further alternative aspect, the present invention relates to a system for removing VOC concentrations in a target gas comprising VOC, wherein the system comprises a) a reaction chamber for exposing the target gas to a halogen gas and a light from a suitable light source having a wavelength sufficient to activate halogen gas to halogen radicals; b) an inlet for receiving the target gas; c) an outlet for releasing the target gas with a removed concentration of VOC; d) a light source for providing a wavelength sufficient to activate halogen gas to halogen radicals; e) optionally a liquefaction section collecting unreacted halogen gas from the outlet; f) optionally a recycling system for recycling the halogen gas from the outlet to the reaction chamber; g) a means for introducing oxygen and a catalyst into the reaction chamber downstream from exposing the target gas to a halogen gas and a light from a suitable light source having a wavelength sufficient to activate halogen gas to halogen radicals, for converting halogen acid to halogen gas, and a recycling system for recycling the converted halogen gas to the reaction chamber.

In a further aspect, the present invention relates to a method for removing VOC concentrations in a target gas comprising VOC, the method comprising, optionally in a suitable reaction chamber, i) exposing the target gas to a halogen radical precursor, such as a halogen gas, and a light from a suitable light source having a wavelength sufficient to activate the halogen radical precursor to halogen radicals, wherein the halogen radicals react with the VOC in the target gas to provide the target gas with a removed concentration of VOC, ii) optionally leading the target gas through a scrubber for decreasing or removing byproducts, and converting halogen acid to the halogen radical precursor, e.g. halogen gas, and recycling the halogen radical precursor extracted from the scrubber to provide the halogen radical precursor to the suitable light source, iii) optionally, collecting unreacted halogen radical precursor by liquefaction, and recycling the halogen radical precursor to the suitable light source; and iv) providing the target gas with the removed VOC concentrations.

In one embodiment, VOC is methane. In another embodiment, VOC is NMVOC.

In a further embodiment, the VOC in the target gas is selected from a primary and/or secondary radiative forcing agents (greenhouse gases), such as hydrocarbons, in particular methane.

In a further embodiment, the target gas polluted with methane and/or NMVOCs is ambient polluted air, air in livestock barns, fugitive emissions etc.

In a still further embodiment, elements of the target gas (e.g. chemically active substances or larger particles) that may damage the device or destroy or inhibit the action of the halogen gas are removed before being exposed to the halogen gas. Typically, the target gas is led through a prefilter to remove the substances or the larger particles from the target gas before being exposed to the halogen gas.

In a further embodiment, the halogen radical precursor is a halogen gas.

In a still further embodiment, the halogen radical precursor, such as the halogen gas, is present in a concentration in an amount which is at least at the stoichiometric level in relation to methane and/or NMVOCs concentration in the target gas.

In a further embodiment, the filter is present for decreasing or removing byproducts, such as halogen acid, e.g., HCl, unreacted halogen, e.g., chlorine, formaldehyde, CO, $CO_2$ before the target gas with the removed VOC concentrations leaves through the outlet.

In another embodiment, the scrubber is present for decreasing or removing byproducts, such as halogen acid, e.g., HCl, unreacted halogen, e.g., chlorine, formaldehyde, CO, $CO_2$ before the target gas with the removed VOC concentrations leaves through the outlet. In a particular embodiment, the halogen acid is converted to the halogen gas and recycled to the reaction chamber bypassing the outlet. Examples of such conversion is the Deacon reaction or the bleach reaction, see for instance FIG. 6. When converting the halogen gas, such as chlorine gas, using catalyzed Deacon reaction, such as the ruthenium oxide catalyzed process developed by Sumitomo Corp, oxygen is supplied from the atmospheric air, however, using pressure swing absorption, pure oxygen can be extracted from the air, and pure oxygen is a preferred option over the use of pure atmospheric air.

The target gas with a removed concentration of VOC leaving the outlet may still contain unreacted halogen gas, which is trapped by condensation. Excessive amounts of halogen gas leaving the outlet are unwanted in large industrial scale such as mine exhaust. Thus, in a preferred embodiment the unreacted halogen gas leaving the outlet is recycled to the reaction chamber. This reduces environmental impact and material streams/running costs. The halogen gas is preferably trapped by liquefaction, such as chlorine gas is trapped by chlorine liquefaction.

Thus, for an optimal large-scale process the chlorine gas is converted from HCl, and the chlorine gas leaving the outlet are recycled to react with methane after being activated to halogen radicals.

In another embodiment, there is no filter or scrubber present.

When no filter or scrubber is present, an alternative is to apply the Deacon reaction such as embodied in the ruthenium oxide catalyzed process developed by Sumitomo Corp., on the entire airstream. Thus, in a further embodiment, when no filter or scrubber is present, the halogen acid is subjected to oxygen and a catalyst, such as ruthenium(IV) oxide in the reaction chamber (illustrated in FIG. 7).

An alternative to applying the Deacon reaction to the halogen acid formed is to include at least two scrubbers. Thus, one embodiment, is to let the target gas through two scrubbers for decreasing or removing byproducts, such as halogen acid, e.g., HCl, unreacted halogen, e.g., chlorine, formaldehyde, CO, $CO_2$ before the target gas with the removed VOC concentrations leaves through the outlet. The above-described embodiments when the halogen acid is converted to the halogen gas and recycled to the reaction chamber bypassing the outlet applies to one or both scrubbers (illustrated in FIG. 9).

In a still further embodiment, the halogen gas is selected from chlorine and bromine gas, in particular chlorine gas. The chlorine gas is purchased or produced on site using electrolysis of saltwater or is part of other gases containing chlorine that can be photolyzed.

In a further embodiment, the wavelength is from 540-180 nm, such as 400-300 nm, for instance 380-320 nm, in particular from 370-350 nm.

In a still further embodiment, the light source is selected from a fluorescent lamp, an LED lamp, an incandescent lamp, a gas discharge lamp, sunlight, or combinations hereof. In particular LED lamps are preferred, and here the optimum photolysis is achieved at a wavelength of approximately 365 nm in the range 300 nm to 400 nm (illustrated in FIG. 8).

One of the main products coming out of the methane oxidation (methane removal) is carbon monoxide. This is undesirable, and therefore it may be useful to convert it to $CO_2$ using a catalyst. Thus, in a further embodiment, the CO formed during methane removal is subjected to a catalyst such as a supported platinum or palladium catalyst, alternatively rhodium and ruthenium, at a suitable temperature (150 to 600° C. depending on catalyst preferably 300° C.) with integrated thermal management, to oxidize the CO to $CO_2$. In particular, the CO formed during methane removal and present in the target gas with a removed concentration of VOC leaving the outlet.

In a further embodiment, the concentrations of VOC in the target gas are below the combustion limit.

In a still further embodiment, the concentrations of methane and/or NMVOCs in the target gas are below the combustion limit. Typically, the target gas comprises methane in a concentration from 1.8 ppm to 5% (50000 ppm).

In another embodiment, the concentrations of VOC in the target gas are above the combustion limit.

In a further embodiment, the concentrations of methane in the target gas are above the combustion limit; such target gases could be found in a coal mine, waste disposal site, or oil formation. Typically, the target gas comprises methane in a concentration of at least 4.4%, such as from 4.4 to 50%.

In a still further embodiment, the suitable reaction chamber is present and has an inlet for receiving the target gas, a reaction zone wherein the target gas is reacted with halogen radicals to remove VOC, such as methane and/or NMVOCs, concentrations in presence of a suitable light source, optionally a system to increase the light source pathway (e.g. mirrors), optionally a filter or scrubber, and an outlet providing the target gas with the removed concentration of VOC.

In a further embodiment, the target gas with the removed concentration of VOC, such as methane, is transported through a filter or scrubber to decrease or remove halogen acid, e.g., HCl, unreacted chlorine, formaldehyde, CO, $CO_2$.

In a still further embodiment, the suitable reaction chamber is present and has an inlet for receiving the target gas, a reaction zone wherein the target gas is reacted with halogen radicals to remove the VOC concentrations, optionally a system to increase the irradiation path length e.g. by using reflective surfaces, optionally a filter or scrubber, and an outlet releasing the target gas with the removed concentration of VOC.

In a further embodiment, ozone gas in a suitable carrier gas, such as air, is added into the reaction chamber in a suitable concentration to convert a hydrogen halide (including HI, HBr and HCl) to volatile and/or photolabile halogen species. In relation to the term "suitable carrier" comprising ozone gas this is known to the skilled person, and includes among others air, nitrogen ($N_2$) and oxygen ($O_2$).

In a still further embodiment, fluid ozone, such as liquid or gas ozone, is added into the reaction chamber in a suitable concentration to convert halogenic (or other halogen species in oxidation state I) to volatile and/or photolabile halogen species.

In a further embodiment, elements of the target gas, such as dust, corrosive species and ammonia and other bases that may harm the device, destroy the halogen gas or otherwise interfere with the function are removed before being exposed to the halogen gas.

In a still further embodiment, the target gas is led through a prefilter to remove larger particles from the target gas before being exposed to the halogen gas.

In a further embodiment, the reaction chamber is present, and the chamber comprises two compartments, one first reaction compartment and a second compartment, a filter/packed bed separating the first and second compartment, wherein the target gas after reaction in the first compartment is transported through the filter/packed bed into the second compartment wherein the target gas with the removed concentration of VOC is exposed to water which reacts with halogenic acid to form halogen that is recycled to the reaction compartment.

In a further embodiment, a reaction chamber is present, and the chamber comprises two compartments, one first gas phase reaction compartment and a second compartment containing a scrubber wherein the target gas, after reaction in the first compartment, is transported through the scrubber wherein the target gas is exposed to a liquid medium which reacts with the hydrogen halide to form aqueous halide and halogen in the zero-oxidation state that is recycled to the reaction compartment.

In a third aspect, the present invention relates to a method for removing methane and/or NMVOCs concentrations in a target gas comprising methane and/or NMVOCs as described in the first aspect, wherein the device additionally comprises a recycling element for recycling halogen radical precursor regenerated from the hydrogen halide gas formed during the reaction, to the reaction chamber.

In a further embodiment, the second aspect of the present invention comprises a recycling element for recycling halogen gas regenerated from the halogen acid gas formed during the reaction, to the reaction chamber.

In a fourth aspect the present invention relates to use of the device of any one of the first, second and third aspects and any embodiments hereof for removing VOC, e.g. methane or NMVOC, concentrations in a target gas comprising VOC.

Further objects and advantages of the present invention will appear from the following description and claims.

BRIEF DESCRIPTION OF THE DRAWINGS

The invention will now be described more fully with reference to the appended drawings illustrating typical embodiments of the invention. These drawings are by no means limiting the scope of the present invention and are only intended to guide the skilled person for better understanding of the present invention.

DETAILED DESCRIPTION

Figure 1:
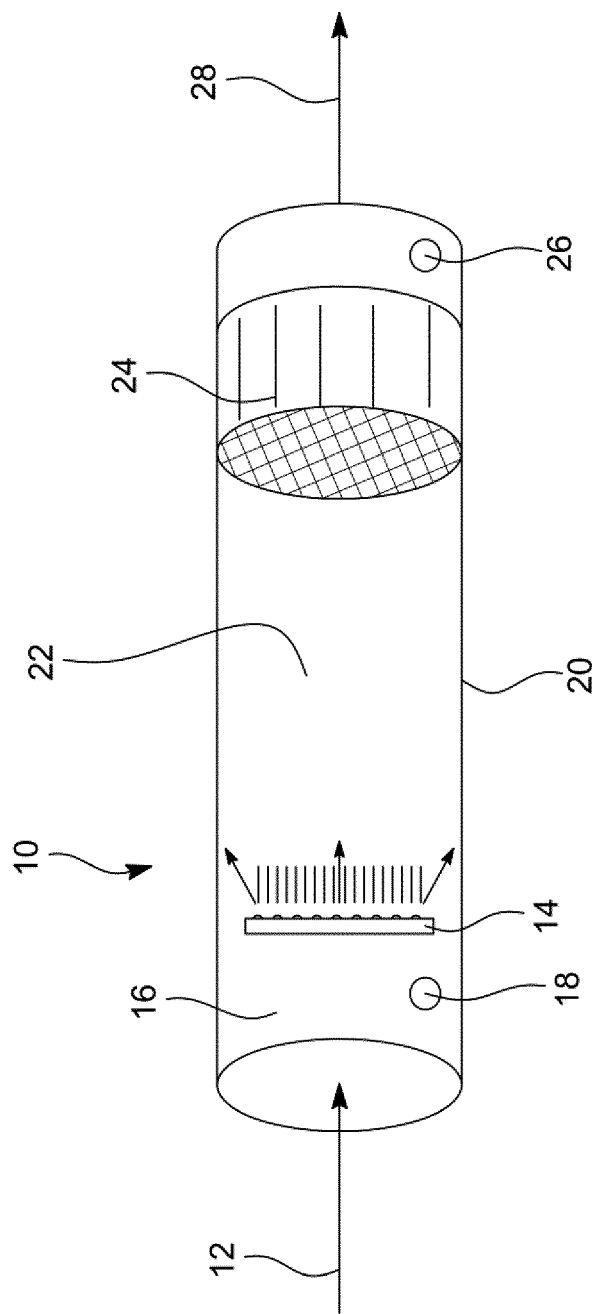
FIG. 1 illustrates a photochemical air purification according to the present invention.

The present inventors provide a solution to sluggish methane and/or NMVOCs reactivity in the gas phase and therefore to methane and/or NMVOCs emission control.

The gas phase and heterogeneous phase halogen reactors are able to control air pollution including methane and other gases by taking advantage of the faster rate of Cl radical reactions with many pollutants relative to many other radicals (OH, $NO_3$, $^1O_2$, $O_3$ ... ), and by taking advantage of the lower energy required to generate Cl radical relative to for example OH radical, as well as by taking advantage of the higher concentration of Cl radicals that can be maintained relative to other radicals due to the nature of the self-limiting reactions in those systems. The examples are given for Cl, but apply also to Br.

The present invention is a fast and inexpensive method for destroying methane air pollution e.g. at concentrations below the explosion/combustion limit. This range of concentrations includes many of the most important fugitive sources of methane, such as with livestock, biogas production, water treatment plants, landfills, oil and gas wells (including abandoned wells), coal mines (including abandoned coal mines), melting permafrost and similar sources in nature. Moreover, the method of the present invention destroys non-methane VOC species, which are also powerful (primary and secondary) greenhouse gases, and both primary pollutants in their own right and cause harmful secondary pollution. Furthermore, the method of the present invention provides good volumetric energy efficiency (measured for example in $kJ/m^3$ of air), low maintenance, and it addresses odor issue, e.g., in livestock production and short treatment time, resulting in a compact system able to treat a large stream of air as expressed for example in the space velocity metric.

Although exposing the target gas to a halogen gas and a light from a suitable light source having a wavelength sufficient to activate halogen gas to halogen radicals may be performed in larger confined areas or semi-enclosed areas, reaction preferably takes place in a suitable reaction chamber.

Preferably, the present invention relates to a system for removing methane from a target gas comprising methane, wherein the system comprises a) a reaction chamber for exposing the target gas to chlorine gas and a light from a suitable light source having a wavelength from 300 nm to 400 nm, sufficient to activate chlorine gas to chlorine radicals; b) an inlet for receiving the target gas; c) an outlet for releasing the target gas with a removed concentration of methane; d) the light source for providing the wavelength sufficient to activate halogen gas to halogen radicals; e) a scrubber for decreasing or removing HCl, before the target gas with the removed methane concentrations leaves through the outlet, wherein the scrubber extracts the HCl and converts it into chlorine gas via oxidation and in the presence of a catalyst; f) optionally a liquefaction section collecting unreacted chlorine gas from the outlet; g) optionally a recycling system for recycling the chlorine gas from the outlet to the reaction chamber; h) optionally a recycling system for recycling the chlorine gas extracted from the scrubber to the reaction chamber.

In a further alternative aspect, the present invention relates to a system for removing methane from a target gas comprising methane, wherein the system comprises a) a reaction chamber for exposing the target gas to chlorine gas and a light from a suitable light source having a wavelength from 300 nm to 400 nm, sufficient to activate chlorine gas to chlorine radicals; b) an inlet for receiving the target gas; c) an outlet for releasing the target gas with a removed concentration of methane; d) the light source for providing the wavelength from 300 nm to 400 nm; e) optionally a liquefaction section collecting unreacted chlorine gas from the outlet; f) optionally a recycling system for recycling the chlorine gas from the outlet to the reaction chamber; g) a means for introducing oxygen and a catalyst into the reaction chamber downstream from exposing the target gas to chlorine gas and the light from the suitable light source having the wavelength from 300 nm to 400 nm, for converting HCl to chlorine gas, and a recycling system for recycling the converted chlorine gas to the reaction chamber.

In a further aspect, the present invention relates to a method for removing methane concentrations in a target gas comprising methane, the method comprising
  i) exposing the target gas to chlorine gas, and a light from a suitable light source having a wavelength from 300 nm to 400 nm sufficient to activate the chlorine gas to chlorine radicals, wherein the chlorine radicals react with the methane in the target gas to provide the target gas with a removed concentration of methane,
  ii) optionally leading the target gas through a scrubber for decreasing or removing byproducts, and converting HCl to the chlorine gas, and recycling the chlorine gas extracted from the scrubber to provide the chlorine gas to the suitable light source, iii) optionally, collecting unreacted chlorine gas by liquefaction, and recycling the chlorine gas to the suitable light source; and iv) providing the target gas with the removed VOC concentrations.

In a still further aspect, the present invention relates to a method for removing methane concentrations in a target gas comprising methane, the method comprising i) exposing the target gas to chlorine gas, and a light from a suitable light source having a wavelength from 300 nm to 400 nm sufficient to activate the chlorine gas to chlorine radicals, wherein the chlorine radicals react with the methane in the target gas to provide the target gas with a removed concentration of methane, ii) leading the target gas through a scrubber for decreasing or removing byproducts, and converting HCl to the chlorine gas, and recycling the chlorine gas extracted from the scrubber to provide the chlorine gas to the suitable light source, iii) collecting unreacted chlorine gas by liquefaction, and recycling the chlorine gas to the suitable light source; and iv) providing the target gas with the removed VOC concentrations.

The terms "decrease", "decreased", "removal", and "decreasing" as used herein as regards removing methane and/or VOC means the abatement, reduction, eradication, destruction, or conversion of methane and/or VOC in order to lower the concentration of methane and/or VOC in the target gas after the reaction with the halogen radicals, such as in the device of the present invention, relative to the target gas before the reaction with the halogen radicals, such as before introduction into the device of the present invention. The removal may be 100% (volume), such as at least 90%, at least 80%, at least 70%, at least 60%, at least 50%, at least 40%, at least 30%, at least 20%, at least 10%, such as from 10 to 100%. All percentage (%) are considered individual embodiments of the present invention. Thus, for instance in one embodiment, the present invention relates to a method for removing from 10 to 100% VOC concentrations in a target gas comprising VOC, the method comprising, optionally in a suitable reaction chamber, exposing the target gas to a halogen radical precursor, such as a halogen gas, and a light from a suitable light source having a wavelength sufficient to activate the halogen radical precursor to halogen radicals, wherein the halogen radicals react with the VOC in the target gas to provide the target gas with a removed concentration of VOC.

The term "volatile organic compounds" as used herein and also abbreviated VOC means both methane and non-methane VOC (i.e. NMVOC) for example aromatic and aliphatic hydrocarbons, ammonia and organic moieties including heteroatoms such as N, S, and/or O, such as selected from a primary and/or secondary radiative forcing agents (greenhouse gases), such as hydrocarbons, in particular methane.

The term "a suitable reaction chamber" as used herein means any reaction chamber having at least one inlet and at least one outlet and constructed of a material that is not degraded by the halogen gas and/or the light and/or the halogen radicals, such as glass reaction chambers and/or plastic reaction chambers, optionally equipped with mirrors or other optical devices to concentrate and increase the pathway of the light source.

The term "a suitable light source" as used herein means any light source that can generate light of a wavelength sufficient to remove the concentration of one or more VOCs, such as methane, in the target gas, such as ambient air, in particular ambient polluted air. Typically, the light source is selected from one or more of a fluorescent lamp, an LED lamp, an incandescent lamp, a gas discharge lamp, sunlight, etc. Typically, the wavelength is from 540-180 nm, such as 400-300 nm, for instance 380-320 nm, in particular from 370-350 nm.

The term "target gas" as used herein means any gas, such as air, in particular ambient air, comprising at least methane, but typically also other VOCs, such as NMVOCs, in concentrations of at least 1.8 ppm. Typically, the target gas comprises methane and VOCs in concentrations that should be decreased and/or removed completely or to a level below detection. In one embodiment, the target gas comprises ambient air including methane in a concentration of at least 1.8 ppm.

The term "ambient air" as used herein is without limitation urban air, countryside air, indoor air, industrially emitted air, process exhaust air, air inside closed spaces (inside cars, busses, trucks, taxis, etc.), air in semi-enclosed spaces (bus stops, train stations, parking house, etc.), air emitted from traffic or ships, air emitted through construction site process, air emitted from biogenic or natural sources, air found within the Earth's atmosphere, air unable to escape the Earth's gravity. The ambient air also includes "ambient polluted air" which means ambient air with high concentrations of VOCs, such as methane, above 1.8 ppm. Such ambient polluted air is typically found in livestock barns, fugitive emissions, fracking sites, leaking or abandoned wells, waste dumps, wetlands etc.

As described herein the target gas is typically ambient air, such as ambient polluted air, but may also be a different target gas exhausted from a chemical facility or other industrial site and contain agents that destroy the halogen gas. In such circumstances the reaction chamber is constructed with a prefilter that is adapted to remove such agents before being exposed to the halogen gas.

When the reaction chamber is in use and ambient air is transported through the chamber, it is often suitable to have a prefilter to remove airborne particulate matter from the target gas before being exposed to the halogen gas. The target gas, such as ambient air, may be transported through the reaction chamber by passive means, such as due to the air circulation and/or wind conditions, or may be transported through the chamber via a fan or by using a pump means.

When the concentrations of VOC in the target gas are below the combustion limit, they are typically below 4.4%, such as between 1.8 ppm and 4.4%.

When the concentrations of VOC in the target gas are above the lower combustion limit, they are typically above 4.4%, but below the upper flammable limit typically 16.4%

In order to remove VOCs, such as methane, in the target gas, such as ambient air, even small concentrations of halogen gas may be suitable, that is concentrations below the stoichiometric level in relation to the VOC concentration in the gas or a concentration sufficient to maintain reactivity via the catalytic halogen recycling method, since such concentrations of halogen gas will remove VOCs from the target gas. Typically, and in order to remove all VOCs, the halogen gas concentration is present in an amount which is at least at the stoichiometric level in relation to the VOC concentration in the gas. Higher concentrations of halogen gas may be used to make certain that all traces of VOCs are removed.

Halogen gas is known to be chlorine, bromine, fluorine, and iodine gas, and consequently, the removal of VOCs, such as methane according to the present invention leads to formation of HCl, HBr, HF and HI, respectively.

When chlorine is used as halogen gas, the method of the present invention generates HCl, which is advantageous in livestock settings because it helps to trap ammonia in the liquid phase, decreasing ammonia emissions. The wastewater exiting the system can be used in the slurry waste as fertilizer or for biogas production.

The method of the present invention is carried out in a suitable reaction chamber, having an inlet for receiving the target gas, a reaction zone wherein the target gas is reacted with halogen radicals to remove the VOC concentrations and an outlet providing the target gas with the removed concentration of VOC. The generation of hydrogen halide gas, unreacted chlorine, formaldehyde, and carbon oxides makes it preferable to have a filter such as a scrubber in the reaction chamber before the outlet. The filter is adjusted to remove hydrogen halide, unreacted chlorine, formaldehyde, and carbon oxides, and may be selected from the group consisting of a trickling filter, active carbon filter, a gas adsorbing filter, an electrostatic filter, a honeycomb filter, a sponge based filter, a fabric filter, or a catalyst to further remove VOC concentrations, or a photocatalyst, or a trickling scrubber filter.

A further embodiment includes a functionality whereby the halogen material is recycled. For example, HCl and HOCl are collected in the scrubber (e.g. a police filter to remove HCl made of activated charcoal or another suitable material) and react to form $Cl_2$ which is used again in the reaction chamber. The yield of HOCl can be enhanced by adding ozone. The performance can be improved using a countercurrent flow. This embodiment decreases use of halogen and emission of halogen.

To optimize the reaction taking place it is preferable to add ozone into the reaction chamber which ozone reacts with halogen species in oxidation state (−1) to create volatile and/or photolabile halogen species, the mechanism thereby becoming catalytic in halogen. The ozone is introduced into the reaction chamber through the inlet or through an opening in the reactor wall into the reaction zone.

FIG. 1 shows an embodiment of the device of the present invention (10), such as a photochemical air purification device of a cylindrical shape (20). Air comprising the target gas for example methane enters through an inlet (12) of the device (10), further into the reaction zone (22) through a catalyst, filter and/or scrubber (24) and out via outlet (28). The target gas will react with chlorine gas in the reaction zone (22) when lamps (14) photolytically generates chlorine radicals, here shown as an array of LED lamps (14). The chlorine gas is injected (16) into the reaction chamber upstream the reaction zone and flows to the reaction zone (22) for generation of chlorine radicals as described above. The chlorine radicals will then react with the methane in the target gas to remove said methane from the target gas. Byproducts are removed by a catalyst, filter and/or scrubber (24). A sensor (18) for measuring gas concentrations is located upstream of the LED array (14) and another similar sensor (26) is located downstream of the catalyst, filter and/or scrubber (24).

Figure 2:
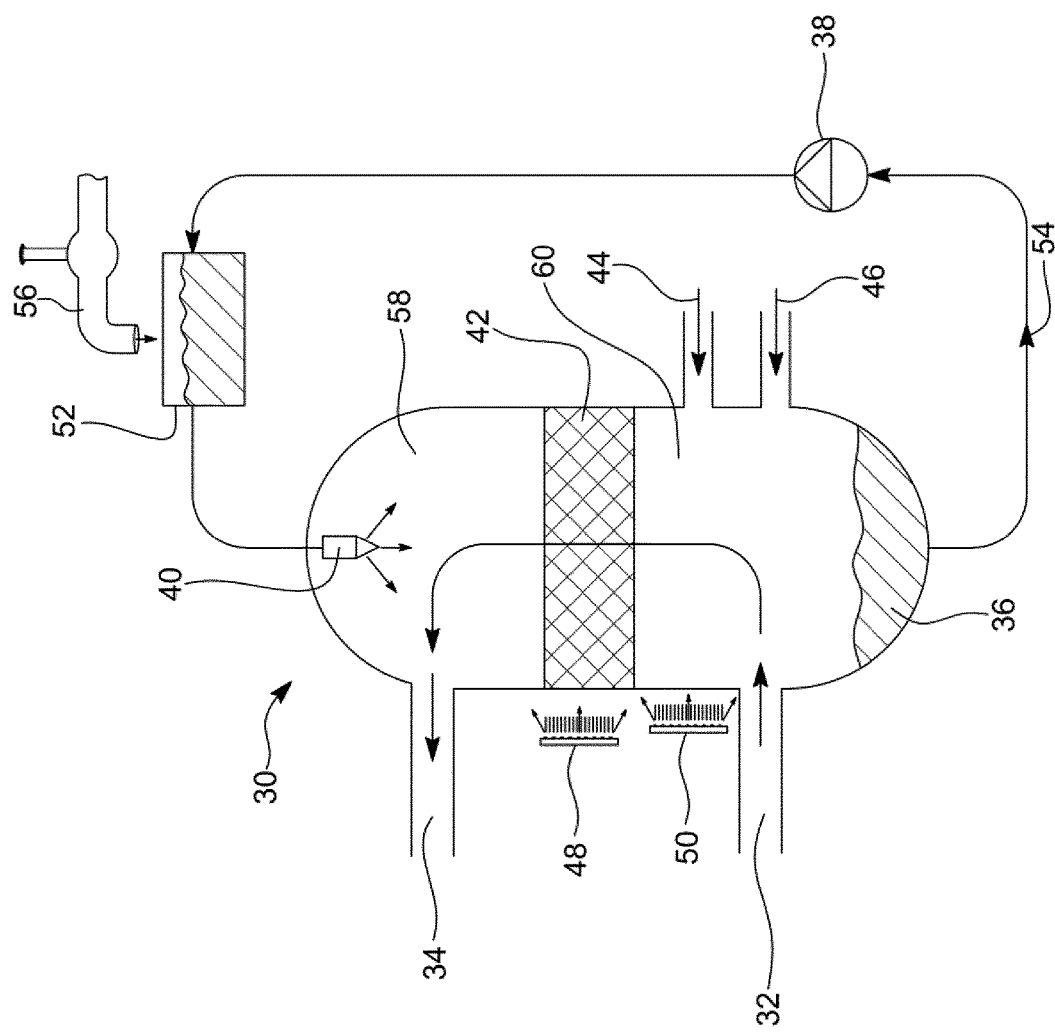
FIG. 2 illustrates a photochemical air purification with recycling/recirculation according to the present invention.

FIG. 2 shows an embodiment of the device of the present invention (30), such as a photochemical air purification device of a tank type shape. Air comprising the target gas is let through an inlet (32) of the device (30), further into the reaction zone (60) through scrubber media (42) and out via outlet (34). The tank holds a sump (36) in the bottom. The target gas will react with chlorine gas let in via inlet (46) and ozone gas via inlet (46) in the reaction zone and LED lamps (50) will photolytically generate chlorine radicals. Ozone is added to the reactor chamber to promote the formation of HOCl. Lamps (48) are for photolytic generation of chlorine radicals in the scrubber (42). The chlorine radicals will then react with the methane in the target gas to remove said methane from the target gas. At the top of the tank a nozzle (40) for spraying water led in from the top via a container (52) holding water provided from at water supply (56). Recirculation of chlorine gas from the bottom of the tank (54) using a pump (38) and to the water container (52). A Sensor (58) for measuring gas concentrations, physical conditions etc. is located in the chamber above the scrubber media (42). Another Sensor (60) for measuring gas concentrations, physical conditions etc is located in the chamber below the scrubber media (42).

Figure 3:
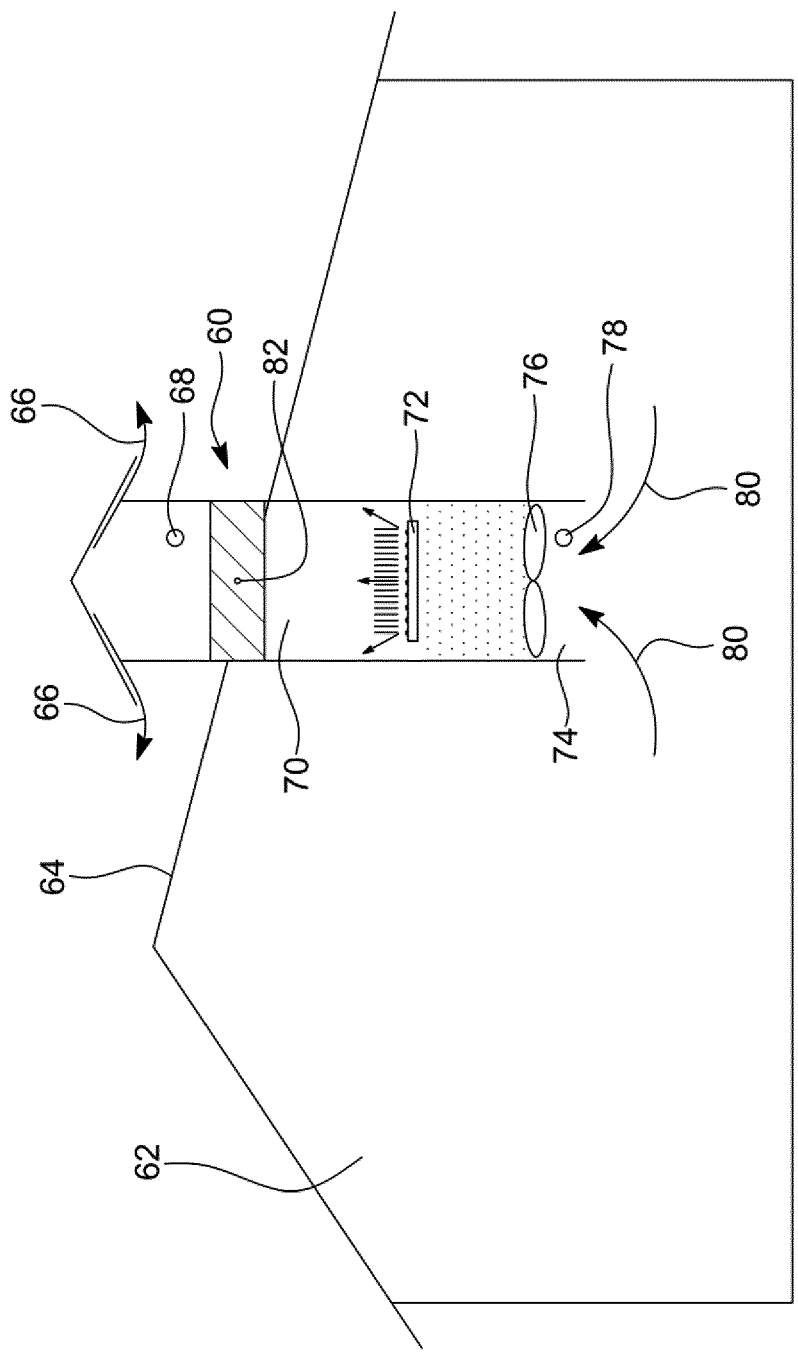
FIG. 3 illustrates an air purification system, in line with ventilation system, for use in livestock barn according to the present invention.

FIG. 3 shows an embodiment of the device of the present invention (60) in line with ventilation system, for use in livestock barn (62). The chimney is an integrated part of the roof (64) and comprises the device of the present invention. Air comprising target gas (80) from the barn is let through the ventilation system/chimney comprising the device of the present invention. A fan (76) drives the air through the chimney from the inlet (74) where chlorine gas is provided and the air flows up to the reaction zone (70) where the chlorine gas is exposed to UV light for example light from LED lamps (72) to initiate chlorine radical formation. The chlorine radicals will then react with the methane in the target gas to remove said methane from the target gas and residual gas is let through a catalyst, filter and/or scrubber (82) and further out via chimney top outlets (66). A sensor for measuring gas concentrations, physical conditions etc. is placed both at the top part (68) and at the bottom part (78) of the chimney.

Figure 4:
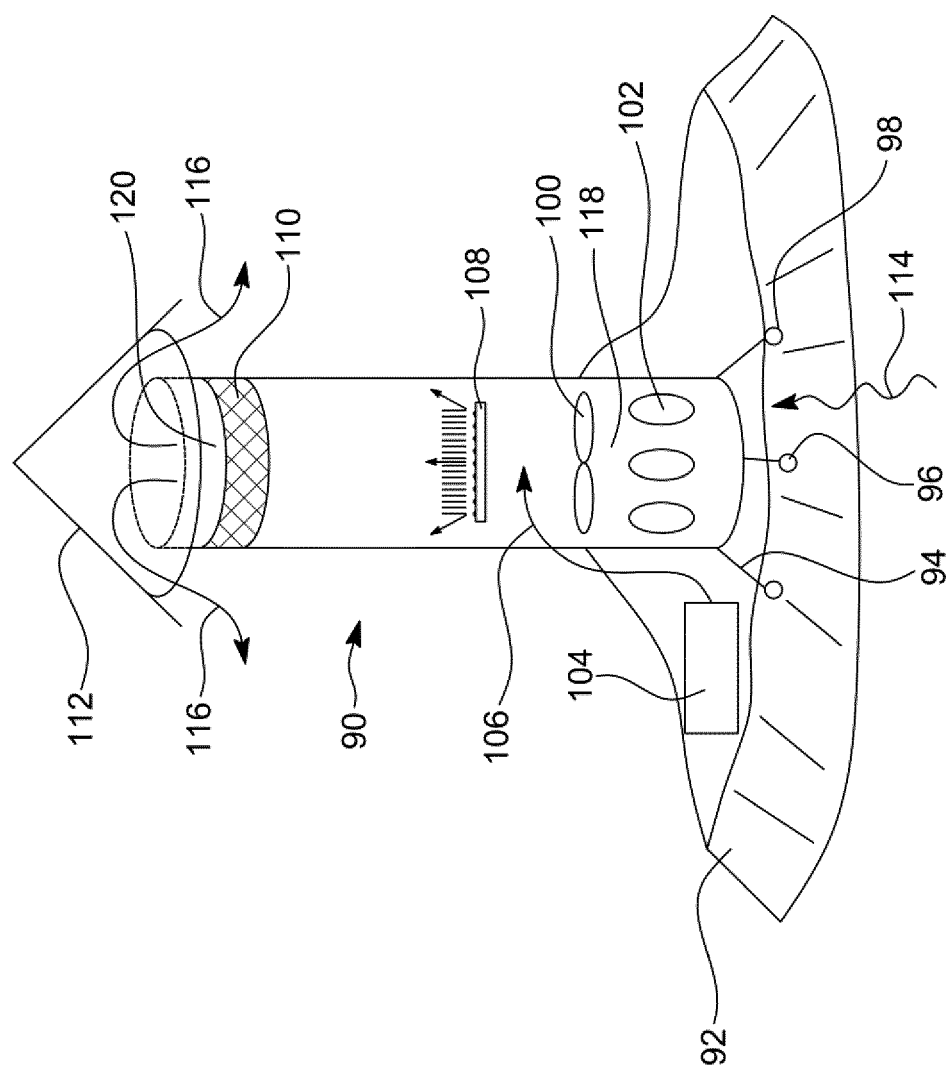
FIG. 4 illustrates a System for capturing and destroying methane from fugitive sources according to the present invention.

FIG. 4 shows an embodiment of the device of the present invention (90) for capturing and destroying methane from fugitive sources, such as leak from ground, garbage dump, sewer, abandoned well or mine. The methane destruction system (90) has a with skirt (92) which covers the ground and is adapted to collect methane emissions (114). The device (90) is equipped with feet to support the device (94, 96, 98). A fan (100) moves incoming target gas/air (102) from a fugitive source up through the chimney (inner volume of the device). The target gas moves into the reaction chamber and further to a reaction zone where the chlorine gas, introduced from a source (104) into the reaction chamber is exposed to UV light for example light from LED lamps (108) to initiate chlorine radical formation in the reaction zone. The chlorine radicals will then react with the methane in the target gas to remove said methane from the target gas and residual gas is let through a catalyst, filter and/or scrubber (110) located downstream from the reaction zone and further out via chimney top (112) and vented to atmospheres (116). A sensor for measuring gas concentrations, physical conditions etc. is placed both at the top part (120) and at the bottom part (106) of the chimney.

Figure 5:
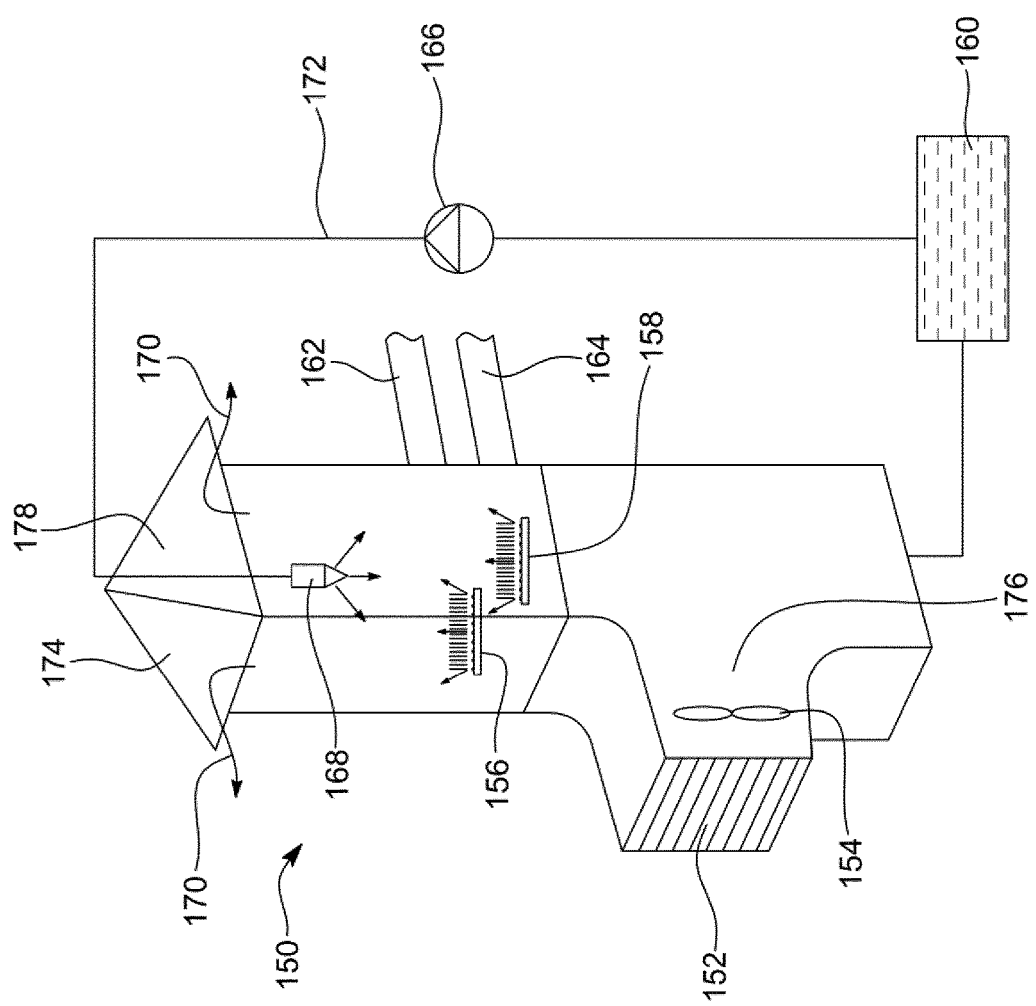
FIG. 5 illustrates a System for removing methane from ambient air according to the present invention.

FIG. 5 shows an embodiment of the device of the present invention (150) for capturing and destroying methane from ambient air being led through inlet (152). A fan (154) moves incoming target gas/air (152) from the ambient air up through the chimney (inner volume of the device). The ambient air moves into the reaction chamber and further to a reaction zone where the chlorine gas, introduced from a source inlet (164) into the reaction chamber and ozone introduced from a source inlet (162) into the reaction chamber is exposed to UV light for example light from LED lamps (156, 158) to initiate chlorine radical formation in the reaction zone. The chlorine radicals will then react with the methane in the target gas to remove said methane from the ambient air and residual air is let out via chimney top (174) and vented to atmospheres (170). The ozone is added to the reactor to promote the formation of HOCl. A sensor for measuring gas concentrations, physical conditions etc. is placed both at the top part (178) and at the bottom part (176) of the chimney. At the top of the device (150) in the reaction chamber a nozzle (168) is located, for spraying water led in from the top via a water solution reservoir (160). There is a recirculation of water from the bottom of the device to the water reservoir (160) via a pump (166) through a tube to the nozzle (168).

Figure 6:
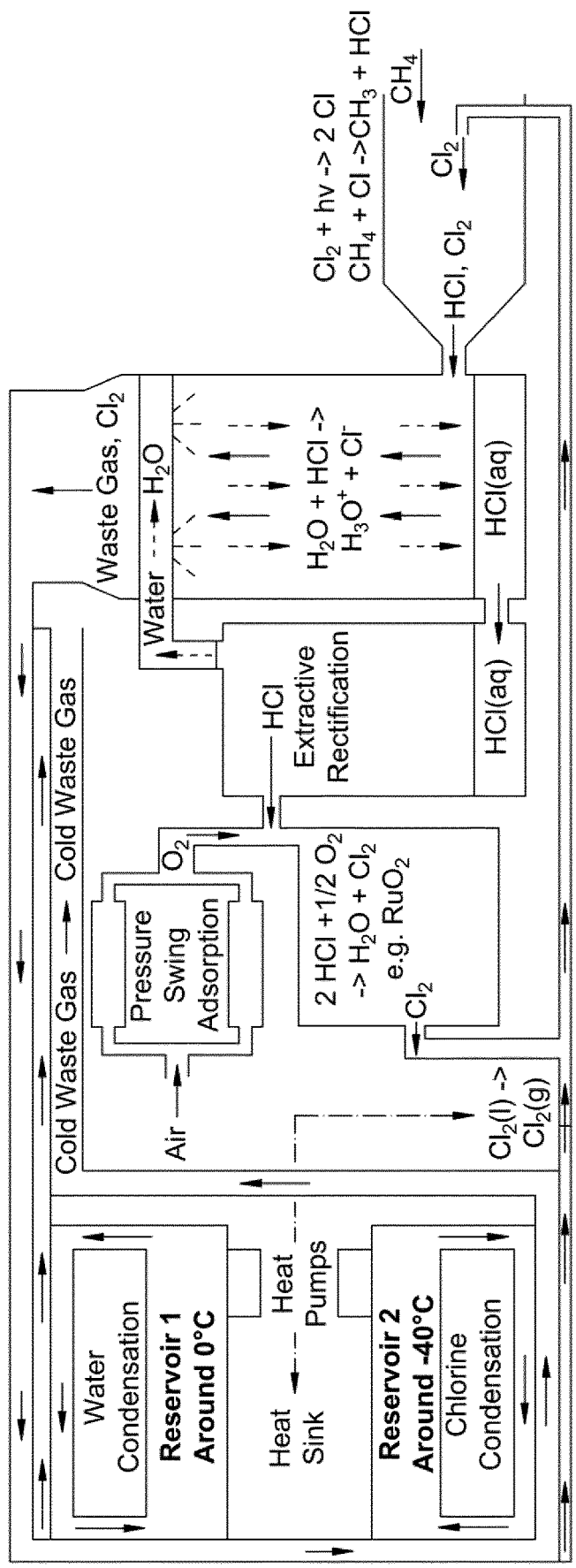
FIG. 6 illustrates a system of the present invention suitable for use in a larger scale industry.

FIG. 6 illustrates one preferred system of the present invention having a device of the present invention and performing the process of the present invention. The oxidation of HCl can be done by the bleach reaction HCl+HOCl→$Cl_2$+$H_2O$, but it is preferred to oxidize HCl using the Deacon Reaction: 4HCl+$O_2$→2$Cl_2$+2$H_2O$. Catalysts exist to speed this process, the latest generation is based on ruthenium(IV) oxide developed by Sumitomo Corp. Earlier processes include Kel-Chlor, Shell-Chlor and MT-Chlor. The Deacon reaction is a preferred alternative to the bleach reaction. FIG. 6 shows an overview of a high intensity process of the present invention. The airstream containing methane enters from lower right. $Cl_2$ gas is added and photolyzed by UV LED lamps to produce chlorine radicals which react with methane yielding HCl. HCl is extracted using a scrubber and converted to chlorine gas ($Cl_2$) by the Deacon reaction. This chlorine gas is then recycled. In addition, there is some $Cl_2$ present in the waste gas stream which is trapped using condensation as shown. As shown, air is entering the system to form pure oxygen for use during the Deacon reaction. This is a preferred alternative to using pure atmosphere, which is a possibility. Further as shown, $Cl_2$ is extracted from the waste air stream by liquefaction. Thermal management involving a heat exchanger will improve the efficiency of this process. It is necessary to remove water vapor from the air first before $Cl_2$ can be removed.

Figure 7:
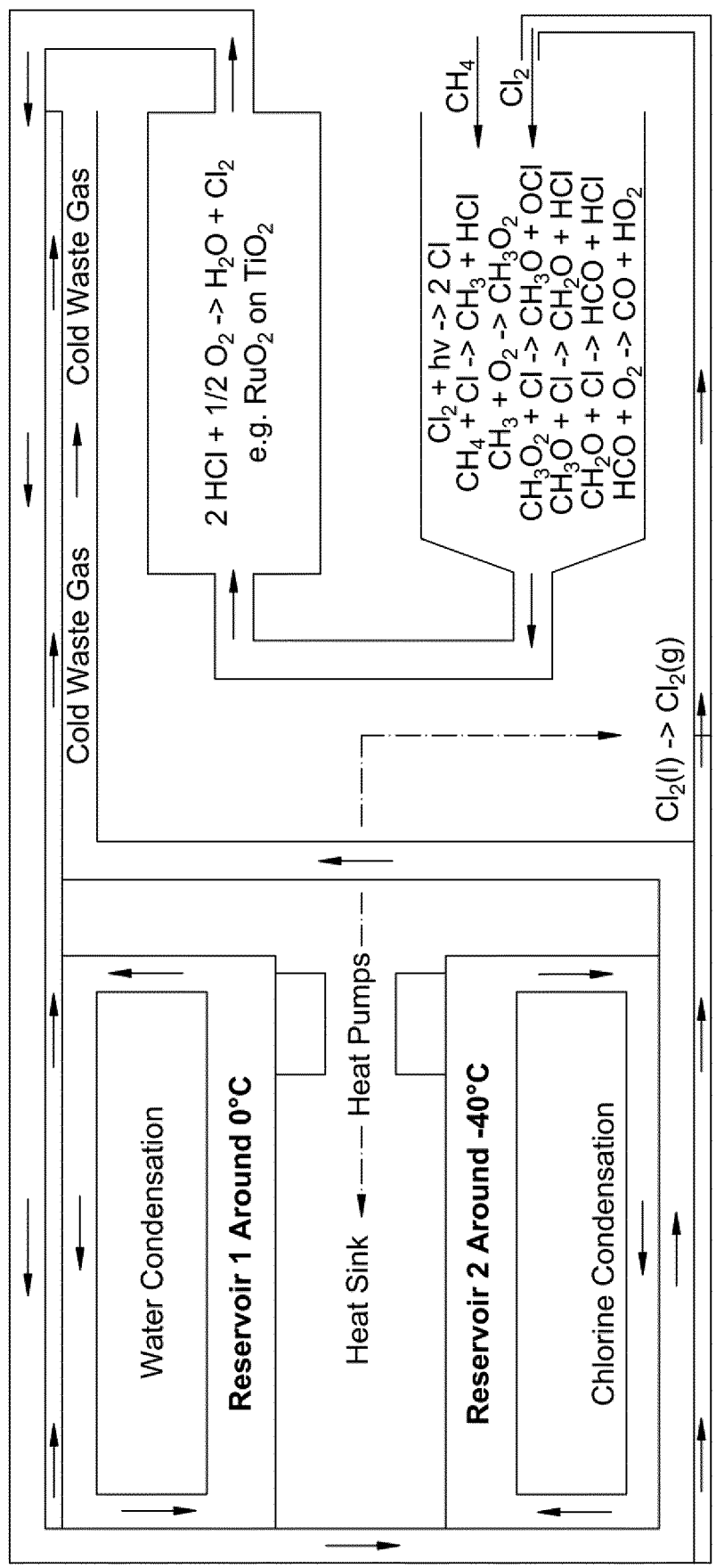
FIG. 7 illustrates a system of the present invention where the scrubber is removed and replaced by applying the Deacon reaction during the methane removal process.

FIG. 7 illustrates one preferred system of the present invention where the Deacon reaction operates on the entire airstream, thus eliminating the need for the scrubber. In addition to eliminating the scrubber, this modification would eliminate the extractive rectification and potentially also the pressure swing adsorption purification of oxygen.

Figure 8:
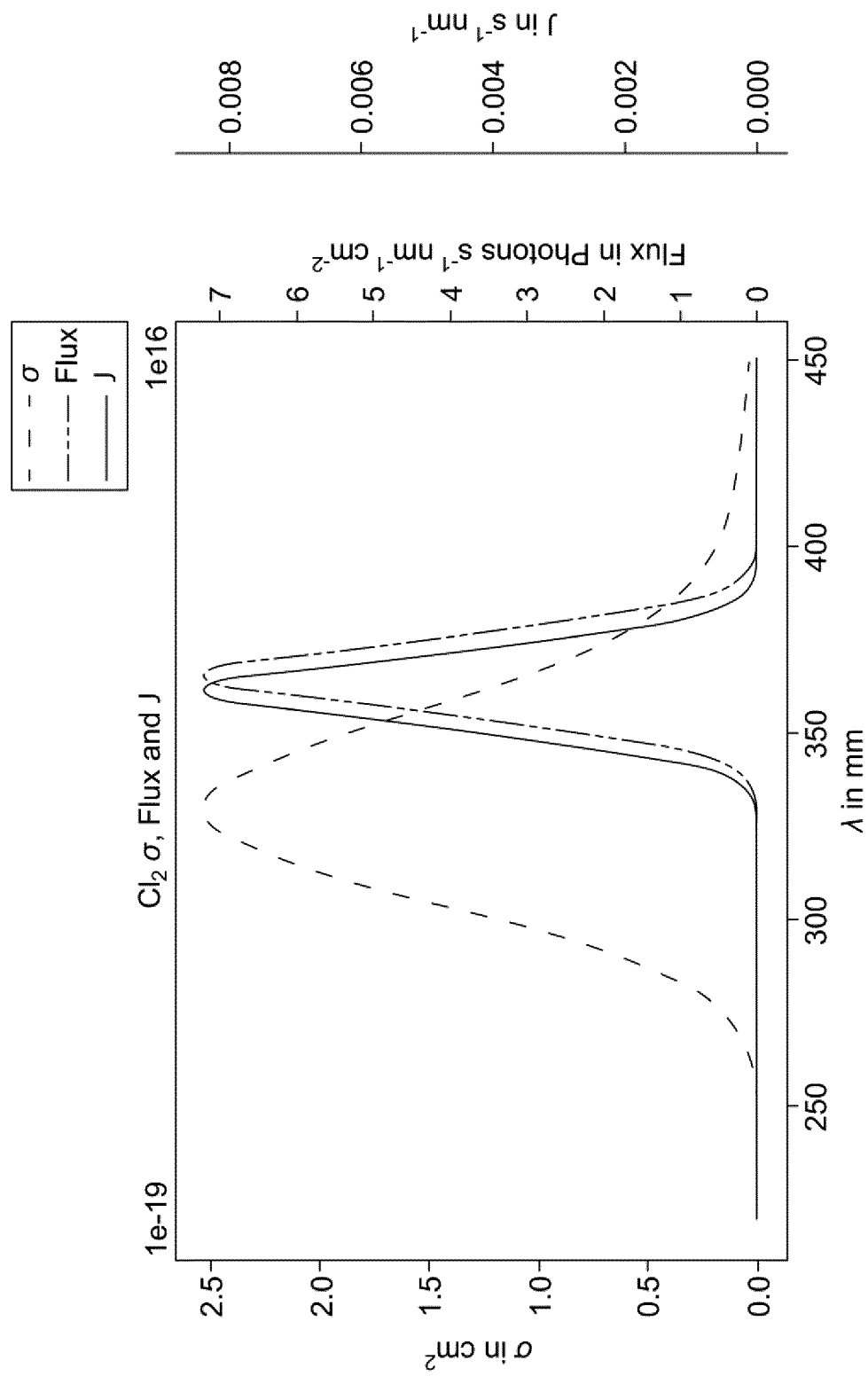
FIG. 8 illustrates the choice of LED wavelengths.

FIG. 8 shows the choice of LED wavelength and as seen the absorption cross section of chlorine increases from 400 to 320 nm, however, LED lights become increasingly expensive as wavelength decreases. An optimum photolysis wavelength is achieved around 365 nm in the range 300 nm to 400 nm.

Figure 9:
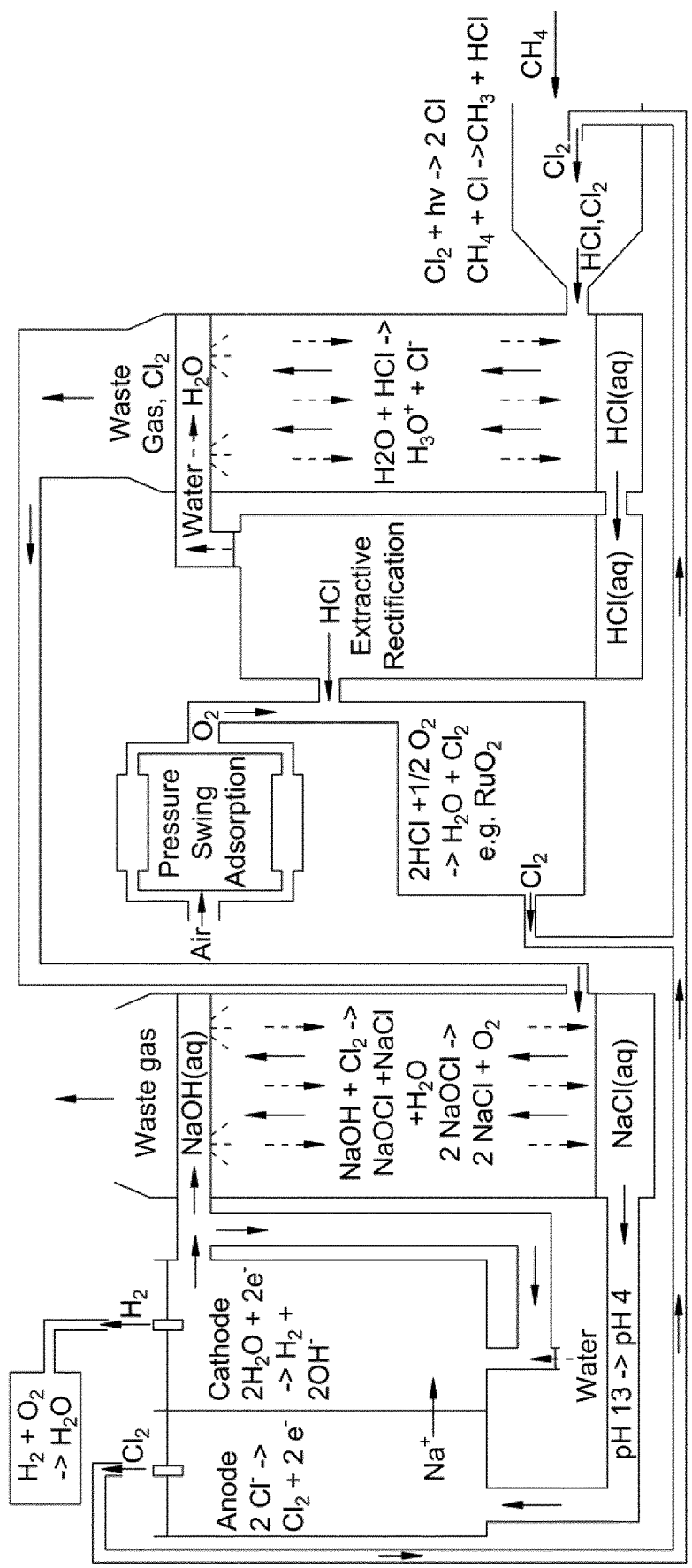
FIG. 9 illustrates the system of the present invention using two scrubbers.

FIG. 9 illustrates another preferred system of the present invention which is the inclusion of a second scrubber to regenerate $Cl_2$. In respect of reduced energy input, the Deacon reaction and cooling is a better choice.

Figure 10:
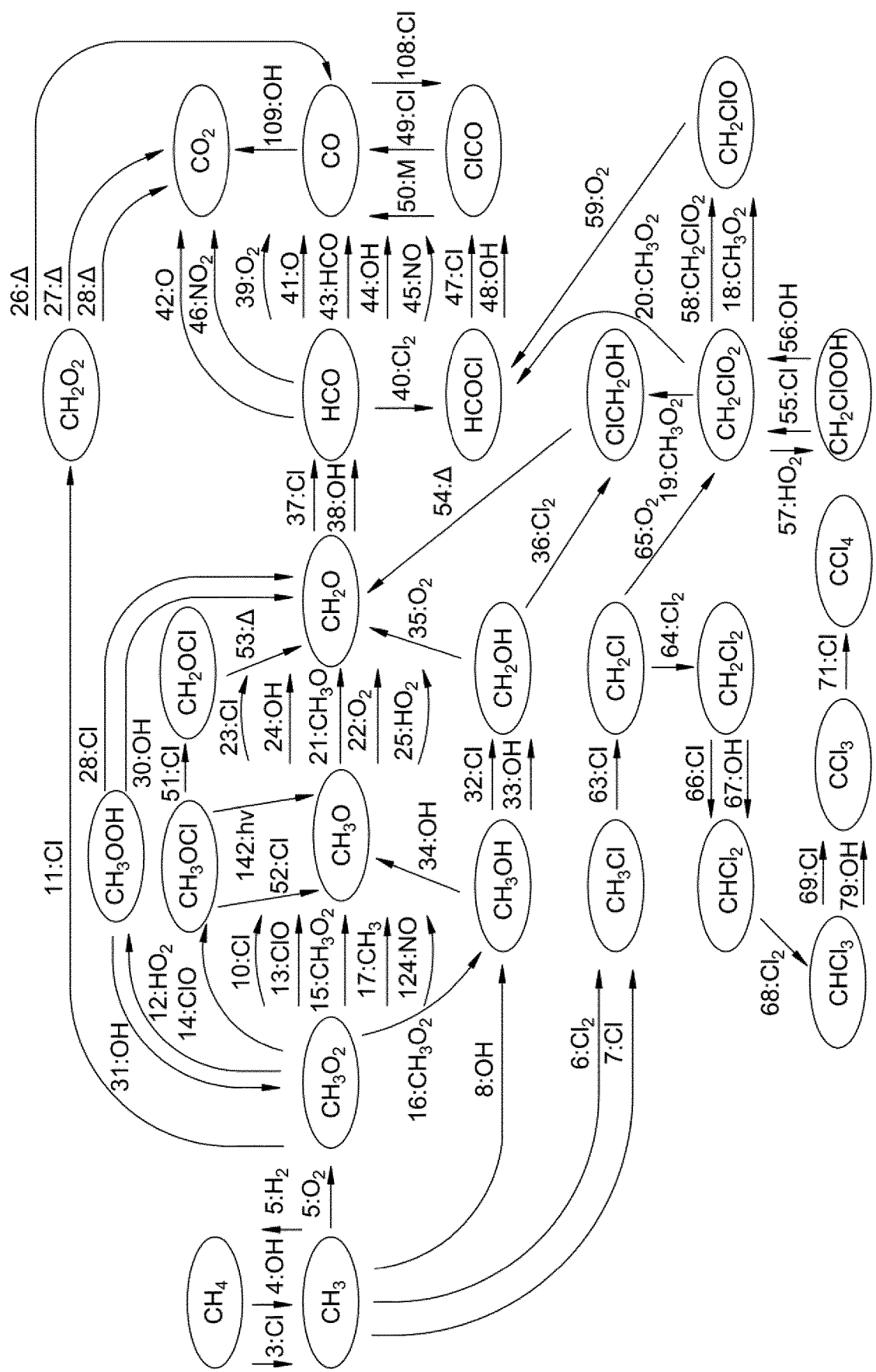
FIG. 10 illustrates a model of the photochemical reactions.

FIG. 10 illustrates a model of the photochemical reactions taking place during the use of the device, process and system of the present invention. The formation of chlorinated methane derivatives was determined to be very small and of no concern. The main product of methane oxidation will be carbon monoxide. This may be undesirable, and therefore it may be useful to convert it to $CO_2$ using a catalyst. A variety of catalysts are available for this purpose such as a supported platinum or palladium catalyst, alternatively rhodium and ruthenium.

Below are described some specific embodiments. The first is a gas phase reactor with an optional system for trapping products. The second is an integrated heterogeneous reactor with chlorine cycling. Note that chlorine compounds in the gas and aqueous phases are corrosive, and care must be taken to choose materials that are compatible with the chemistries of the reactors. For example, glass and many types of plastic are inert.

A Gas Phase Photochemical Reactor Based on Chlorine Atoms.

The method consists of these steps: waste air is assumed to be flowing through a channel.

1. Introduction of chlorine precursor.

A suitable precursor is a molecule that can be photolyzed to produce chlorine atoms (Cl), such as chlorine gas ($Cl_2$). Chlorine gas can be purchased, or it can be produced cheaply and easily on site in the small quantities that are required by the process using electrolysis of saltwater [Harnung and Johnson 2012]. Other gases containing chlorine that can be photolyzed could also be used.

2. Activation of the chlorine precursor to produce chlorine atoms.

Preferred method is photolysis such as

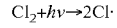

The light source is any light capable of photolyzing the precursor such as the sun, for example LED lamp, fluorescent lamp, discharge lamp, incandescent lamp, laser. The wavelength of light ('hv' represents a photon) is shorter than 550 nm, ideally UV light with a wavelength shorter than 400 nm for example a LED at 360 nm.

This is followed by reaction of the chlorine atom with the pollution, in case of methane:

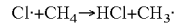

More in general:

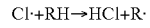

where RH represents a pollutant hydrocarbon with a hydrogen atom H and the rest of the molecule called 'R·', R· and H· together comprising methane, benzene, capric acid, etc., etc. After initial attack by Cl⁻, the molecular fragment R· will proceed to react with atmospheric molecular oxygen $O_2$ and other oxidizing species present in the system; the key to initiating this cascade of reactions is the initial attack by Cl⁻.

3. The Oxidised Material is Removed from the Air Stream.

This could be performed using a particle filter such as a fiber filter [Ardkapan 2014] or electrostatic precipitator [Kwiatkowski 2019]. A preferred embodiment is a wet scrubber because it can trap particles, acting as a diffusion battery, and also trap acids such as the hydrochloric and organic acids produced in the photochemical reactions, due to their affinity for the aqueous phase.

Second Chlorine Cycling Using a Scrubber (Heterogeneous Reactor, Countercurrent Flow, Packed Bed) Photoreactor.

The scrubber chamber is packed with objects capable of dispersing the flow of the aqueous phase, increasing surface area and area of contact between the fluid and air, and not blocking the UV light, such as purpose-designed beads or Raschig rings of inert material. The aqueous phase flows downward through the bed, for example from a nozzle acting as a showerhead at the top of the reactor. The air stream flows up from below or from the side. UV lights are attached around the outside of the reactor. Chlorine is introduced to initiate the process.

For example, using chlorine gas, $$Cl_2 + h\nu \rightarrow 2Cl\cdot$$

And, in presence of methane:

$$Cl\cdot + CH_4 \rightarrow HCl + CH_3\cdot$$

this reaction is a specific example of the general form:

$$Cl\cdot + RH \rightarrow HCl + R\cdot$$

Successively, the radical formed reacts with oxygen in the following way:

$$R\cdot + O_2 + M \rightarrow RO_2\cdot + M$$

Where 'M' is a molecule from the atmosphere that acts as a collision partner. The system will produce $RO_2\cdot$ and $HO_2\cdot$ due to known processes (e.g., $RO\cdot$ and the single carbon atom form $CH_3O\cdot$ lead to $RO_2\cdot$ and $HO_2\cdot$ formation), leading to $ClO\cdot$ formation $$Cl\cdot + HO_2\cdot \rightarrow ClO\cdot + OH\cdot$$

$$Cl\cdot + RO_2\cdot \rightarrow ClO\cdot + RO\cdot$$

ClO would then react with $HO_2\cdot$ Forming HOCl and oxygen:

$$ClO\cdot + HO_2\cdot \rightarrow HOCl + O_2$$

HOCl and HCl dissolve easily in water:

$$HOCl(g) \rightarrow HOCl(aq) \quad HCl(g) \rightarrow HCl(aq)$$

Where they react to reform $Cl_2$:

$$HOCl + HCl \rightarrow Cl_2 + H_2O$$

This reaction completes the cycle allowing the chlorine to be recycled. If the conditions permit it, the electrolysis of the aqueous media where HOCl and HCl are dissolved may further increase the production of chlorine gas.

These reactions are listed to illustrate the main features of the chemical process and are not intended to limit the invention in any way or be an exhaustive list.

Further, since the aqueous phase is moving downward, while the polluted air is moving upward, this will act to conserve chlorine within the system improving catalytic efficiency and reducing cost and escape of chlorine. Optionally, a second scrubber or filter may be added after the heterogeneous reactor/scrubber as a police filter to capture chlorine species.

Ozone may be added to the reactor to promote the formation of HOCl, in order to maintain the HCl to HOCl stoichiometry to optimize recycling of chlorine.

The aqueous phase will flow into and through the scrubber and collect at the bottom where it may be drained or pumped into a reservoir, from which it may be drained, or pumped to the top of the system to recirculate through the scrubber. It will be necessary to renew this fluid either by changing it at certain intervals, or by continually introducing a slow flow of water into the system; wastewater can be drained into the municipal water system provided it meets requirements as regards impurity levels, etc. Alternatively, it could be used to enhance the acidity of a biogas generation system for example using animal waste on a farm. Chlorine will be added slowly to the system to compensate for loss to the gas and aqueous phases.

A control system will regulate addition of water, chlorine, UV light, air flow, pumping. There is a powerful recycling effect when ozone is introduced to the system. It means that only a little chlorine and light are used to initiate the process, and then ozone can be used to maintain it, further improving performance and saving energy, and decreasing chlorine emissions.

Livestock Barn Embodiment

The new system as illustrated in FIG. 6 uses a livestock barn scenario to determine performance. This may be built as a prototype to demonstrate the effectiveness.

Conditions of 60,000 m³/hr (17 m³/s) and 50 ppm of methane.

Preferred Conditions:
Residence time of 5 to 20 seconds
Volume of 100 to 400 m³
Chlorine photolysis rate of 0.1 to 10 s$^{-1}$
Chlorine concentration of 100 to 50,000 ppm
Performance>90% removal of methane preferably >95%
Total power 50 kW.

Mineshaft Embodiment

The feasibility study focuses on exhaust air from a mineshaft with a flow of 150 m³/s, temperature of 40° C., 100% relative humidity, methane mole fraction of 5000 ppm. The preferred system requires 15 s residence time corresponding to a volume of 2250 m³, a photolysis rate of 0.2 s$^{-1}$ and 8750 ppm of $Cl_2$, LED lighting, the ruthenium oxide catalyzed process developed by Sumitomo Corp., for recovering chlorine, thereby achieving 99% conversion of methane with a power input of 14.6 MW. The energy input could further be reduced to ca 11.9 MW depending on modifications to the ruthenium oxide catalyzed process developed by Sumitomo Corp., or reduced through more efficient cooling.

Preferred Ranges in Above Embodiment are:

| Residence time | 5 to 25 s |
| Chlorine photolysis rate | 0.1 to 10 s$^{-1}$ |
| Chlorine concentration | 100 to 50,000 ppm |

Performance>90% removal of methane preferably >95%

All references, including publications, patent applications and patents, cited herein, are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

Recitation of ranges of values herein are merely intended to serve as a short method of referring individually to each separate value falling within the range, unless otherwise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also provide a corresponding approximate measurement, modified by "about", where appropriate).

All methods described herein can be performed in any suitable order unless otherwise indicated herein or otherwise clearly contradicted by context.

The terms "a" and "an" and "the" and similar referents as used in the context of describing the invention are to be construed to insert both the singular and the plural, unless otherwise indicated herein or clearly contradicted by context. Thus, "a" and "an" and "the" may mean at least one, or one or more.

The term "and/or" as used herein means each individual alternative as well as the combined alternatives, for instance, "a first and/or second barrier" is intended to mean one barrier alone, the other barrier alone, or both the first and the second barrier at the same time.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

Throughout the description when "selected from" or "selected from the group consisting of" is used it also means all possible combinations of the stated terms, as well as each individual term.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

This invention includes all modifications and equivalents of the subject matter recited in the aspects or claims presented herein to the maximum extent permitted by applicable law.

The features disclosed in the foregoing description may, both separately and in any combination thereof, be material for realizing the invention in diverse forms thereof.

Each and every embodiment as described in connection with the different aspects also applies to the further aspects described above, both individually and in combination.

SPECIFIC EMBODIMENTS OF THE INVENTION

Livestock Barn

Elevated methane concentrations are commonly seen in the exhaust air from barns, for example barns for milk cows, cattle, pigs, chickens and other livestock. This embodiment, shown in FIG. 3, is fitted into the exhaust system, providing a simple, low-maintenance, low-cost method of destroying methane. For example Cortus et al. [Cortus 2015] found a dairy cow emits 390 g of methane per day. For a barn with 300 cows and a ventilation of 1500 m³/hour/cow means a methane concentration of 16 ppm in the exhaust air. Such a barn may have a number of ventilator units each with a capacity of 10,000 to 20,000 m³/hr of air. This is a simple direct chlorine reactor, which could optionally be fitted with a scrubber and chlorine recycling system.

| Symbol | Unit | Value | Name |
|---|---|---|---|
| Q | m³/hr | 20000 | volume flow |
| r_m(Cl) | m(Cl atoms) g/hr | 2000 | rate of addition of Cl |
| d | m | 1 | Diameter of tube |
| x(CH$_4$) | ppm | 16 | methane mixing ratio |
| x(VOC) | ppm | 20 | VOC mixing ratio |
| P | W | 3000 | Power of diode at 360 nm |
| l | m | 3 | length of photolysis region |
| v | m/s | 7 | flow velocity |

Fugitive Emissions

Methane is released from sources such as leaking natural gas pipelines, coal seams, leaking storage reservoirs, melting permafrost, and landfills. This embodiment (FIG. 4) collects air from these fugitive emission sources and destroys the methane and odor. Portable, for a temporary installation.

| Symbol | Unit | Value | Name |
|---|---|---|---|
| Q | m³/hr | 1000 | volume flow |
| r_m(Cl) | m(Cl atoms) g/hr | 50 | rate of addition of Cl |
| d | m | 1 | Diameter of tube |
| x(CH$_4$) | ppm | 10 | methane mixing ratio |
| x(VOC) | ppm | 5 | VOC mixing ratio |
| P | W | 250 | Power of diode at 360 nm |
| l | m | 1 | length of photolysis region |
| v | m/s | 1 | flow velocity |

Industrial Scrubber

An industrial setting may place greater demands on an emissions control system, to reduce emissions of byproducts. A permanent installation (FIG. 5) can justify a system with better performance; therefore, this unit includes a scrubber to trap HCl emission and recycle the chlorine.

| Symbol | Unit | Value | Name |
|---|---|---|---|
| Q | m³/hr | 5000 | volume flow |
| r_m(Cl) | m(Cl atoms) g/hr | 250 | rate of addition of Cl |
| d | m | 1 | Diameter of tube |
| x(CH$_4$) | ppm | 10 | methane mixing ratio |
| x(VOC) | ppm | 5 | VOC mixing ratio |
| P | W | 750 | Power of diode at 360 nm |
| l | m | 2 | length of photolysis region |
| v | m/s | 2 | flow velocity |

Test Prototype

A portable system (such as shown in FIG. 1 or FIG. 2) to use in the laboratory for optimization and to bring on-site to test feasibility.

| Symbol | Unit | Value | Name |
|---|---|---|---|
| Q | m³/hr | 500 | volume flow |
| r_m(Cl) | m(Cl atoms) g/hr | 25 | rate of addition of Cl |
| d | m | 1 | Diameter of tube |
| x(CH$_4$) | ppm | 10 | methane mixing ratio |
| x(VOC) | ppm | 5 | VOC mixing ratio |
| P | W | 100 | Power of diode at 360 nm |
| l | m | 1 | length of photolysis region |
| v | m/s | 0.5 | flow velocity |

Ambient Air Cleaning

There is significant interest in a system that could remove methane from air at ambient concentrations.

| Symbol | Unit | Value | Name |
|---|---|---|---|
| Q | m³/hr | 10000 | volume flow |
| r_m(Cl) | m(Cl atoms) g/hr | 75 | rate of addition of Cl |
| d | m | 2 | Diameter of tube |
| x(CH$_4$) | ppm | 2 | methane mixing ratio |
| x(VOC) | ppm | 1 | VOC mixing ratio |
| P | W | 400 | Power of diode at 360 nm |
| l | m | 3 | length of photolysis region |
| v | m/s | 0.9 | flow velocity |

REFERENCES

Adnew 2016: Adnew, G. A., C. Meusinger, N. Bork, M. Gallus, M. Kyte, V. Rodins, T. Rosenørn, and M. S. Johnson, Gas-phase advanced oxidation as an integrated air pollution control technique, AIMS Environmental Science 3(1), 141-158, doi: 10.3934/environsci.2016.1.141, 2016.

Ardkapan 2014: S. R. Ardkapan, M. S. Johnson, S. Yazdi, A. Afshari, and N. C. Bergsøe, Filtration efficiency of an electrostatic fibrous filter: Studying filtration dependency on ultrafine particle exposure and composition, Journal of Aerosol Science, 72, 14-20, 2014.

Atkins 2013: Atkins, P. and De Paula, J., 2013. Elements of physical chemistry. Oxford University Press, USA.

Cortus 2015: Cortus, E. L., Jacobson, L. D., Hetchler, B. P., Heber, A. J. and Bogan, B. W., 2015. Methane and nitrous oxide analyzer comparison and emissions from dairy freestall barns with manure flushing and scraping. Atmospheric Environment, 100, pp. 57-65.

Darnall, K. R., Lloyd, A. C., Winer, A. M., and Pitts, J. N. (1976). Reactivity Scale for Atmospheric Hydrocarbons Based on Reaction with Hydroxyl Radical. Environmental Science and Technology, 10(7):692-696.

Francis 2015: Pope Francis, 2015. Encyclical on climate change and inequality: On care for our common home. Melville House.

IPCC 2013: Stocker, T. F., Qin, D., Plattner, G. K., Tignor, M., Allen, S. K., Boschung, J., Nauels, A., Xia, Y., Bex, V. and Midgley, P. M., 2013. Climate change 2013: The physical science basis. Contribution of working group I to the fifth assessment report of the intergovernmental panel on climate change, 1535.

Harnung and Johnson, 2012: Harnung, S. E. and Johnson, M. S., 2012. Chemistry and the Environment. Cambridge University Press.

Johnson 2009: M. S. Johnson and J. Arlemark, A method and device for cleaning air, European Patent Agency 08388017.9; International Patent Cooperation Treaty PCT/EP2009/055849, 2009; U.S. Pat. No. 8,318,084 B2, 2011.

Kwiatkowski 2019: S. Kwiatkowski, M. Polat, W. Yu and M. S. Johnson, Industrial Emissions Control Technologies: Introduction, In: Meyers R. (eds) Encyclopedia of Sustainability Science and Technology, Springer, New York, NY, 2019, https://doi.org/10.1007/978-1-4939-2493-6_1083-1.

NIST Chemistry WebBook: NIST Standard Reference Database Number 69, https://webbook.nist.gov/chemistry/, DOI: https://doi.org/10.18434/T4D303, 2018.

U.S. DoD 2014: Quadrennial Defense Review 2014, United States of America Department of Defense WB 2016: World Bank. 2016. The cost of air pollution: strengthening the economic case for action (English). Washington, D.C.: World Bank Group. http://documents.worldbank.org/curated/en/781521473177013155/The-cost-of-air-pollution-strengthening-the-economic-case-for-action WHO Ambient: Ambient (outdoor) air pollution, World Health Organization Fact Sheet, 08-05-2018, accessed 4 Mar. 2020, https://www.who.int/news-room/fact-sheets/detail/ambient-(outdoor)-air-quality-and-health WHO Indoor: Household air pollution and health, World Health Organization Fact Sheet, 08-05-2018, accessed 4 Mar. 2020, https://www.whoint/news-room/fact-sheets/detail/household-air-pollution-and-health/detail/ambient-(outdoor)-air-quality-and-health

The invention claimed is:

1. A method for removing methane concentrations in a target gas comprising methane, the method comprising, optionally in a suitable reaction chamber, exposing the target gas to a halogen radical precursor and a light from a suitable light source having a wavelength sufficient to activate the halogen radical precursor to halogen radicals, wherein the halogen radicals react with the methane in the target gas to provide the target gas with a removed concentration of methane.

2. The method of claim 1 wherein the halogen radical precursor is a halogen gas.

3. The method of claim 1 wherein the methane in the target gas is selected from a primary and/or secondary radiative forcing agents.

4. The method of claim 1 wherein the target gas polluted with methane is selected from ambient polluted air, air in livestock barns, fugitive emissions.

5. The method of claim 2 wherein the halogen gas is selected from chlorine and bromine gas.

6. The method of claim 1 wherein the wavelength is from 540-180 nm.

7. The method of claim 1 wherein the light source is selected from a fluorescent lamp, an LED lamp, an incandescent lamp, a gas discharge lamp, sunlight, or combinations hereof.

8. The method of claim 1 wherein the concentrations of methane in the target gas are below the combustion limit.

9. The method of claim 8 wherein the methane is in a concentration from 1.8 ppm to 5% (50000 ppm).

10. The method of claim 1 wherein the concentrations of methane in the target gas are above the combustion limit.

11. The method of claim 2 wherein the halogen gas concentration is present in an amount which is at least at the stoichiometric level in relation to the methane concentration in the gas.

12. The method of claim 1 wherein the gas with the removed concentration of methane is transported through a filter or scrubber to decrease or remove halogen acid.

13. The method of claim 1 wherein the suitable reaction chamber is present and has an inlet for receiving the target gas, a reaction zone wherein the target gas is reacted with halogen radicals to remove the methane concentrations, optionally a system to increase the light source pathway, optionally a filter or scrubber, and an outlet providing the target gas with the removed concentration of methane.

14. The method of claim 1 wherein fluid ozone is added into the reaction chamber in a suitable concentration to convert halogen species in oxidation state I formed by the halogen radicals reacting with the methane in the target gas to volatile and/or photolabile halogen species.

15. The method of claim 2 wherein elements of the target gas selected from dust, corrosive species, ammonia and/or other bases that may harm the device or destroy the halogen gas are removed before being exposed to the halogen gas.

16. The method of claim 2 wherein the target gas is led through a prefilter to remove larger particles from the target gas before being exposed to the halogen gas.

17. The method of claim 1 wherein the reaction chamber is present, and the chamber comprises two compartments, a first compartment and a second compartment, a filter/packed bed separating the first and second compartment, wherein the target gas after reaction in the first compartment is transported through the filter/packed bed into the second compartment wherein the target gas with the removed concentration of methane is exposed to water which reacts with halogenic acid to form halogen that is recycled to the first compartment.

18. The method of claim 5, wherein the halogen gas is chlorine gas, and the chlorine gas is purchased or produced on site using electrolysis of saltwater or is part of other gases containing chlorine that can be photolyzed.

\* \* \* \* \*